Feb. 15, 1927.
M. E. DAYTON
WINDSHIELD CLEANER
Filed Sept. 4, 1923
1,618,068
2 Sheets-Sheet 1
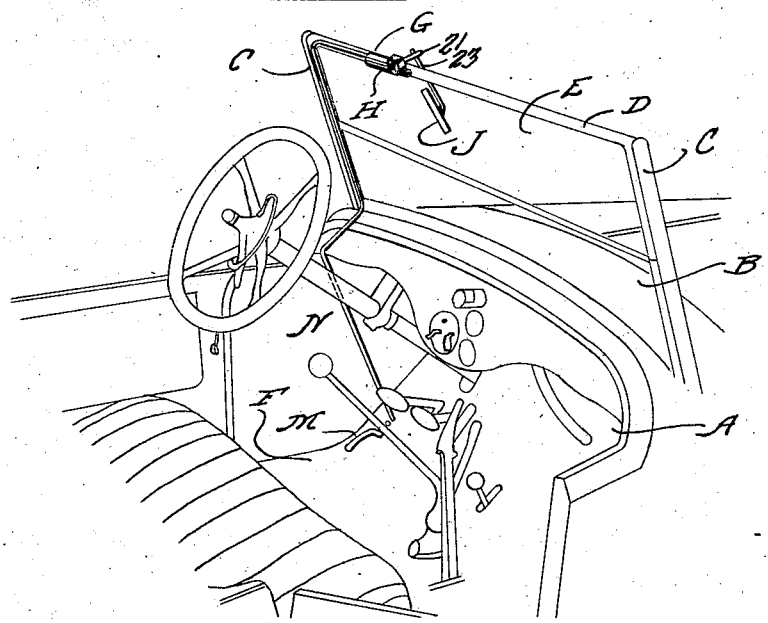
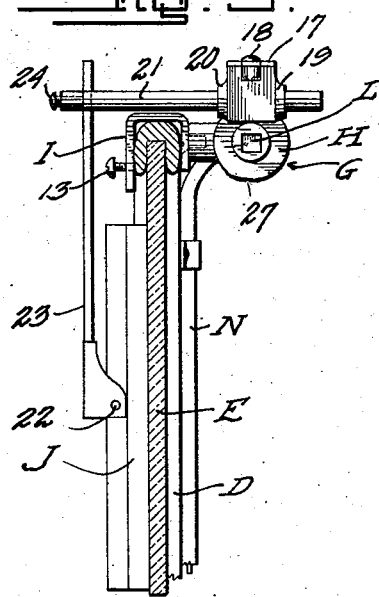
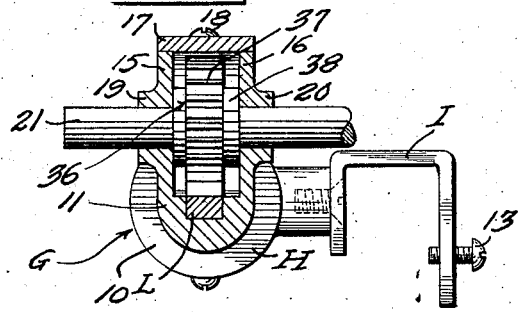
Inventor
Max E. Dayton.

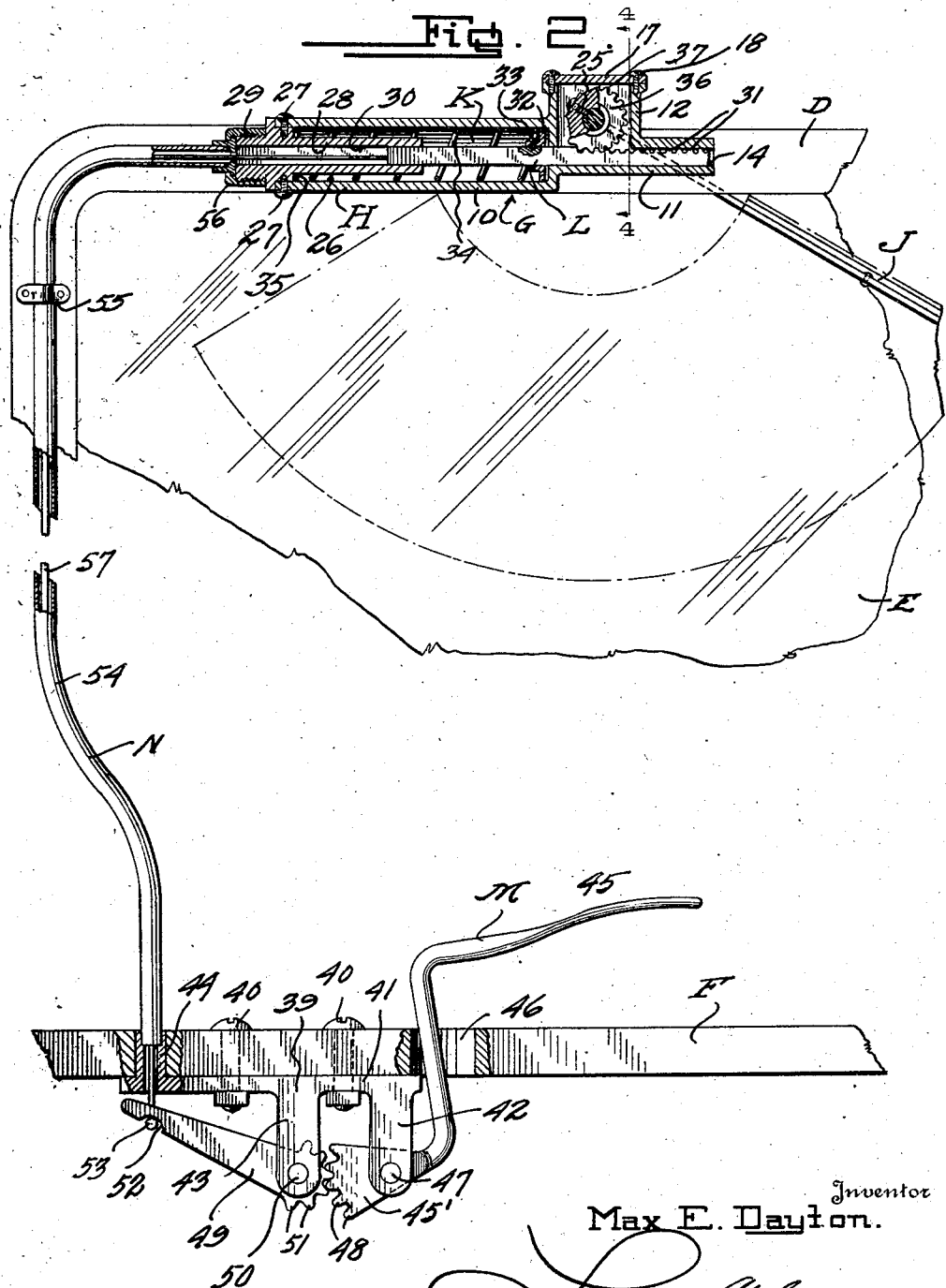

Patented Feb. 15, 1927.

1,618,068

UNITED STATES PATENT OFFICE.

MAX E. DAYTON, OF HIBBING, MINNESOTA.

WINDSHIELD CLEANER.

Application filed September 4, 1923. Serial No. 660,806.

My invention relates to improvements in window pane cleaners and more particularly to cleaners adapted for application to windshields of motor vehicles for removing rain, snow, dust or water of condensation from said windshields.

The primary object of the invention is in the provision of a windshield cleaner capable of being applied to practically all types of windshield frames, and one which may be controlled by the foot of the operator of the vehicle, thereby leaving both hands of the operator free to control the vehicle.

Further objects of the invention are to provide windshield cleaners which will not detract from the appearance of the windshields; which will automatically return to a normal "out of the way" position when the foot is released; and which has the working parts fully protected from inclement weather.

Other objects of my invention will appear in the following detailed description, taken in connection with the accompanying drawings, forming a part of this specification, and in which drawings:—

Figure 1 is a perspective view of a part of a motor vehicle and showing my improved cleaner applied to the windshield thereof.

Fig. 2 is an enlarged fragmentary view partly in elevation and partly in section of the inside of a windshield showing the cleaner attached thereto, and pedal operating means for said cleaner.

Fig. 3 is an end view of the device showing the manner in which the cleaner is applied to the windshield.

Fig. 4 is a vertical sectional view of a portion of the device on an enlarged scale, taken on the line 4—4 of Figure 2 and looking in the direction of the arrows.

In the drawings, wherein similar reference characters designate corresponding parts throughout the views, A designates any type of motor vehicle including a windshield B supported by standards C and comprising a frame D and a pane of glass E, and a floor board F; and G an improved windshield cleaner comprising a support H adapted to be secured to the frame D as by clamp I, a suitable squeegee J carried by support H for engaging one face of the pane of glass E, means K for imparting an oscillatory motion to the squeegee including a reciprocatory element L closely adjacent and movable longitudinally of the frame D, foot operated means M carried by floor board F in the example shown remote from means K and in a convenient position to be operated by the driver of the vehicle, and motion transmitting means N between means K and M.

The support H is in the form of a housing including main body portion 10, minor body portion 11 and upwardly extending portion 12 for enclosing parts of means K, and this support H may be detachably positioned any desired place along the frame D by the relatively U shaped clamp I held by a binding screw 13. The main body portion 10 is elongated and preferably round in cross section while the minor body portion 11 is elongated but provided with a square opening 14 which forms a guide way for one part of means K. The portion 12 is positioned above the minor body portion 11 and has straight side walls 15 and 16, the purpose of which will be more fully explained. A cover plate 17, held by screws 18 is provided in order to facilitate assembly. Extensions 19 and 20 are provided on the walls 15 and 16 to form bearings for a shaft 21 which extends through the portion 12.

The squeegee J for engaging one face of the pane of glass E may be pivotally connected as at 22 to an arm 23 which extends through the outer end of the shaft 21. The squeegee J may be adjusted so as to wipe relatively near the top or lower portion of the pane E by the screw 24 which allows for the raising or lowering of the arm 23. The squeegee may also be adjusted with respect to the pane E by loosening the set screw 25 and moving the shaft 21 in the desired direction. It can be seen that it is desirable to raise and lower the cleaning member in order to provide a clear vision for operators of different heights.

The guide 26 is secured in the open end of the main body portion 10 by screws 27; said guide having a portion 28, of a diameter less than that of the inside of the main body portion extending a distance into said main body portion and an externally screw threaded portion 29 extending outwardly of the main body portion. This guide is provided with a square opening 30 which extends throughout its entire length and forms a guide way for the other end of the reciprocatory element L. This opening 30 is placed in axial alignment with the opening 14 in the minor body portion 11.

The means K which includes the element L is mounted in support H and said reciprocatory element is preferably square in cross section, and of a size to slidably fit into the openings 14 and 30; the element being provided at one end portion at its upper face with teeth 31 forming a rack. A collar 32 is securely held in the desired position on the element L by a set screw 33 and is engaged by one end of an expansion coil spring 34, the other end of said spring engaging a shoulder 35 of the guide 26. The purpose of this spring to be clearly brought out in the operation of the device. A segmental pinion 36 having teeth 37 is securely held against rotation on the shaft 21 by the set screw 25. These teeth 37 are in meshing relation with the teeth 31 of the rack L for imparting motion to the shaft 21. The hub 38 of the pinion 36 extends outwardly from each side thereof and bears against the inner faces of the walls 15 and 16 for preventing longitudinal movement of the shaft 21.

The foot operating means M which may be positioned at a place convenient to the operator, includes a support 39 which may be securely fastened to the under side of the floor board F as by bolts 40. The support 39 comprises a body portion 41 having depending arms 42 and 43 and projection 44 adapted to extend up through the floor board F. The foot pedal 45 is adapted to extend through a hole 46 in the floor board F and pivots at its lower end on a pin 47 carried by the arm 42. The lower end of the pedal 45 is flattened out as at 45' and is provided at its arcuate end with teeth 48. A lever 49 is pivoted near its lower end on a pin 50 carried by the arm 43 and is also provided with teeth 51 at its lower end for engagement with the teeth 48 of the pedal 45. The upper end of the lever 49 is provided with a socket 52 for receiving a ball or the like 53 carried by the lower end of the motion transmitting means N. It can be seen that when the foot pedal 45 is pressed down, the upper end of the lever 49 will also move down, due to the engaging teeth 48 and 51, for transmitting movement to the motion transmitting means N.

The motion transmitting means N in the example shown, includes a flexible metal housing 54 being secured at one end to the portion 44 of the support 39 and held in place by fastening means 55. The opposite end of the metal housing may be secured to the guide 26 by a coupling 56 threaded upon the outwardly extending portion 29. A control wire 57, one end of which is secured to the ball 53, extends upon the socket 52 up through the flexible metal housing 54 and is securely fastened at its other end to one end of the means L.

While I have shown by way of example, one means of operating the cleaner, it is to be understood that various other means may be employed for transmitting movement to the cleaner.

The operation of the device is as follows. As is shown in Figure 2 of the drawings, the moving elements are all shown in a normal "out of the way" position. Should the operator desire to obtain a clear vision through the windshield, all that is required is to first press and then release pressure on the foot pedal 45. When the pedal 45 is pressed down, the upper end of the lever 49, through the engaging teeth 48 and 51, is caused to move downwardly, thereby pulling on the control wire 57. The control wire 57 being fastened to the reciprocatory element L, draws the element in one direction and as the teeth 37 of the pinion 36 are in engagement with the teeth 31, the squeegee J will be moved in an arcuate path across the pane E. The collar 32 being rigidly mounted on the element L, compresses the spring 34 when element L is moved by control wire 57. It can now be seen that when pressure on the pedal 45 is released, the spring 34 will move the squeegee J back through an arcuate path to a normal position and by drawing the control wire 57, the foot operated means M will also be returned to a normal position.

Changes in detail may be made without departing from the spirit or scope of my invention; but,

I claim:

1. In a windshield cleaner, the combination of a housing having guideways provided at each end thereof and extending in axial alignment with one another, a shaft journaled in the housing in right angular relation to the axis of the spaced guideways and adapted to carry a squeegee, a pinion mounted on said shaft within said housing, a rack having its ends slidably mounted in said guideways and engaging the pinion, means for imparting a reciprocatory motion to said rack whereby a rotary reciprocatory motion will be imparted to said pinion, and a stop collar rigidly carried by the intermediate portion of the rack between the guideways for alternately engaging portions of the housing and limiting the movement of the rack in either direction.

2. In a windshield cleaner, the combination of a support including a housing comprising a tubular main body portion having a minor body portion formed at one end thereof provided with a guideway extending co-axially of the main body portion, a guide removably carried by the opposite open end of the main body portion and having a reduced portion extending into the body portion provided with a longitudinally extending guideway disposed co-axial with the guideway of the minor body portion, a rack slidably mounted in said guideways, a shaft journalled in the minor body portion and adapted to carry a squeegee, a pinion mounted on said shaft inwardly of said housing and engaging said rack, means opperatively connected with said rack for manually imparting sliding movement to the rack in one direction, a coil spring arranged in the tubular body portion of the housing between said guideways and acting upon the rack for movement of the rack in an opposite direction, and means for limiting movement of the rack in either direction.

MAX E. DAYTON.